United States Patent [19]

Swirbel et al.

[11] Patent Number: 5,328,728
[45] Date of Patent: Jul. 12, 1994

[54] PROCESS FOR MANUFACTURING LIQUID CRYSTAL DEVICE SUBSTRATES

[75] Inventors: Thomas J. Swirbel, Davie; Melanie Williams, Deerfield Beach; Robert J. Mulligan, Plantation, all of Fla.

[73] Assignee: Motorola, Inc., Schaumburg, Ill.

[21] Appl. No.: 993,535

[22] Filed: Dec. 21, 1992

[51] Int. Cl.$^5$ .............................................. B05D 5/06
[52] U.S. Cl. ..................... 427/600; 427/162; 427/163; 427/168; 427/372.2; 29/592.1; 359/80; 359/81
[58] Field of Search ............... 427/600, 162, 163, 168, 427/372.2; 29/592.1; 359/80, 81

[56] References Cited

U.S. PATENT DOCUMENTS

| | | | |
|---|---|---|---|
| 4,148,128 | 4/1979 | Feldman | 29/592 R |
| 4,341,445 | 7/1992 | Matsuyama et al. | 359/81 |
| 4,470,668 | 9/1984 | Inoue et al. | 359/81 |
| 4,705,360 | 11/1987 | Funada et al. | 359/81 |
| 4,973,138 | 11/1990 | Yamazaki et al. | 359/81 |

Primary Examiner—Shrive Beck
Assistant Examiner—David Maiorana
Attorney, Agent, or Firm—Dale W. Dorinski

[57] ABSTRACT

A process for manufacturing a substrate (12) used in a device (10) for containing a liquid crystal fluid (30) between two spaced electrodes. A plurality of spacers (35) is distributed on a first surface of a substrate by coating the first surface with an admixture of spacers dispersed in a liquid (36). The admixture is agitated during the applications step in order to maintain a uniform dispersion of the spacers in the liquid. The liquid is then evaporated from the substrate surface, leaving a plurality of spacers distributed on the substrate. Preferably, an ester alcohol dispersant is employed in the admixture in order to facilitate dispersion of the spacers in the liquid. Ultrasonics are preferred as the means of agitating the admixture during application. Ultrasonic energy can also be applied to the substrate during application of the admixture to the substrate. Ultrasonic energy can also be applied to the admixture at the point of application (44) of the admixture onto the substrate.

3 Claims, 2 Drawing Sheets

PROCESS FOR MANUFACTURING LIQUID CRYSTAL DEVICE SUBSTRATES

TECHNICAL FIELD

This invention relates generally to Liquid Crystal Devices, and in particular to methods of fabrication of substrates for Liquid Crystal Devices.

BACKGROUND OF THE INVENTION

Liquid crystal devices employing electro-optical materials that vary their transmissivity in response to an applied electrical potential are commonly used in visual displays of information in applications such as computers, televisions, calculators, radios, automobile controls, and many other products. While display devices embodying these principles are well known, problems with the manufacture of such devices are also well known. One problem that occurs when liquid crystal displays (LCDs) are made thin (in order to achieve low voltage operation) is short circuits appearing across the fluid layer. Another problem is the difficulty in providing consistency of the gap between the two electrodes in the LCD. Since the performance of the device is a function of the consistency of the gap, it is important to accurately control this spacing for maximum uniformity. Unevenness in the spacing produces poor optical properties and promotes rapid deterioration of the liquid crystal fluid. Because of these and other problems, the manufacture of reliable, long-life liquid crystal displays has been difficult.

During the manufacture of LCDs, small spheres are typically applied to a glass substrate to serve as spacers. These spheres perform the function of precisely setting the gap between the upper and lower substrates, the gap being subsequently filled with the liquid crystal fluid. The spheres must be applied in a uniform manner to prevent the substrates from bowing and in order to maintain a uniform gap. Uniform dispersion of the spheres is also required in order to achieve the proper display contrast and performance. Typically, spacer spheres are applied to the substrate by spraying on a suspension of the spheres in a chlorofluorocarbon solvent (CFC). The recent global banning of all CFC usage will soon impact the processes used to manufacture LCDs and an alternative technique is required. Some of these alternative techniques being evaluated by the industry are spraying the spheres using water-based suspensions. Spraying from these types of suspensions does not yield uniform spacer placement on the substrates. Electrostatic spraying has been used with good results reported in the literature. However, electrostatic systems remain unproved in production use and are very expensive.

In addition, existing methods of applying the spacers are not adequate where a high number of spacers per unit area (for example, greater than 20 spacers per square millimeter) of the display is required, such as in large area displays. Current methods result in spacer clumping or aggregation when the spacers are applied in high densities. Clearly, an alternative, low-cost method of applying the spacers onto the substrate would be desirable. Such a method should avoid the use of CFCs and also result in a high-quality LCD.

SUMMARY OF THE INVENTION

Briefly, a process for manufacturing a substrate for a device for containing a liquid crystal material between two spaced electrodes is disclosed. A plurality of spacers is distributed on a first surface of a substrate by coating the first surface with an admixture of spacers dispersed in a liquid. The admixture is agitated during the applications step in order to maintain a uniform dispersion of the spacers in the liquid. The liquid is then evaporated from the substrate surface, leaving a plurality of spacers distributed on the substrate.

In the preferred embodiment of the invention, an ester alcohol dispersant is employed in the admixture in order to facilitate dispersion of the spacers in the liquid. The preferred embodiment also utilizes ultrasonics as the means of agitating the admixture during application.

Another embodiment of the invention utilizes ultrasonic energy applied to the substrate during application of the admixture to the substrate.

Still another embodiment of the invention utilizes ultrasonic energy applied to the admixture at the point of application of the admixture onto the substrate.

DETAILED DESCRIPTION OF THE PREFERRED EMBODIMENTS

Figure 1:
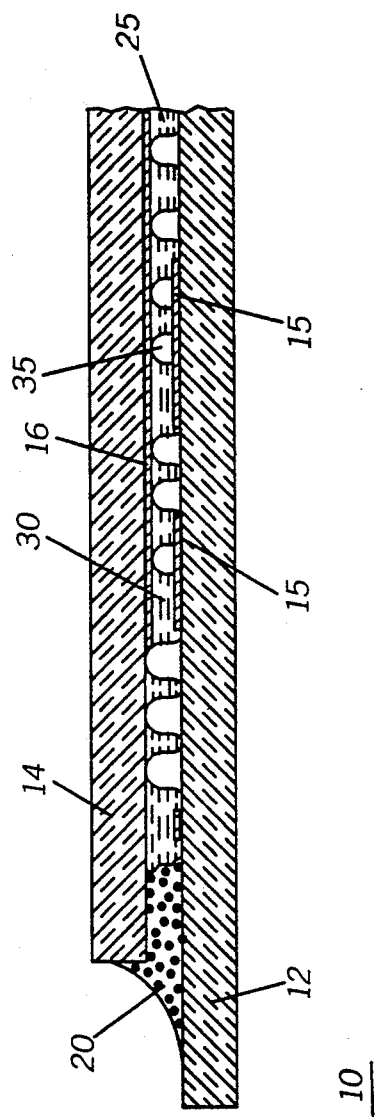
FIG. 1 is a cross-sectional view of a liquid crystal display made from a substrate prepared in accordance with the invention.

A description of the invention is now presented and is best understood from a consideration of the following text in conjunction with the drawing figures, in which like reference numerals are carried forward.

Figure 2:
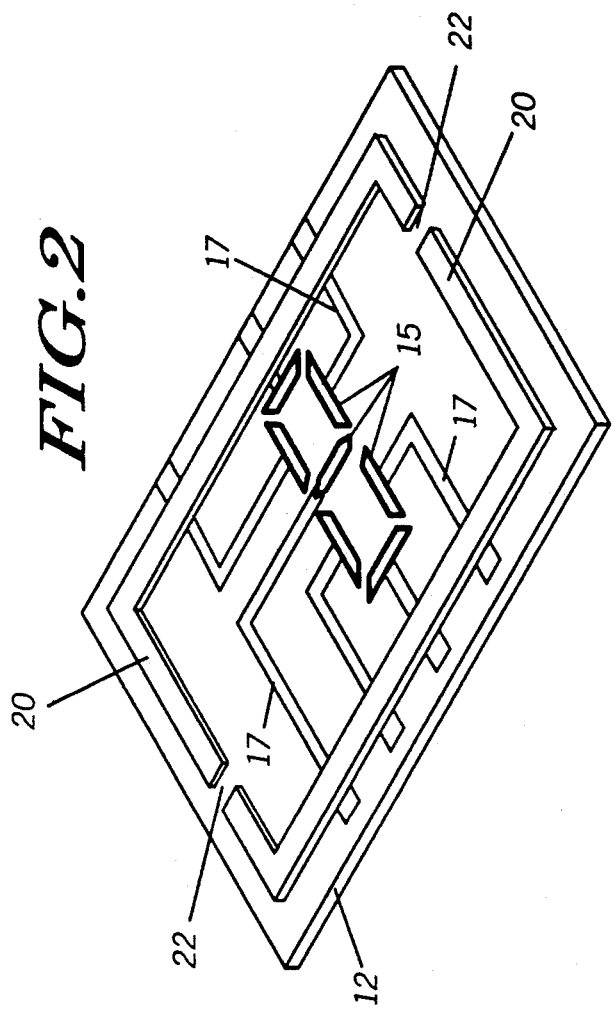
FIG. 2 is an isometric view of a substrate used in fabricating a liquid crystal display.

Referring now to FIG. 1, a liquid crystal device (LCD) 10 is shown in cross-sectional view. A complete device comprises a transparent bottom substrate 12 and a transparent top substrate 14. An upward-facing surface of the bottom substrate 12 has a preferably transparent electrical conductor pattern 15 deposited thereon. The exact shape of the pattern is highly variable and is subject to the design and wishes of the user. A typical conductor pattern is shown in FIG. 2 where a seven segment, digital display is formed. On a top substrate 14, an electrical conductor 16 is deposited in areas corresponding to the electrical conductive pattern 15 on the bottom substrate. From the segments of the electrical conductive pattern 15, transparent leads 17 are routed to contact pads to provide an electrical terminations near the edge of the substrate 12.

A seal 20 surrounds the region defined by the electrical conductor patterns 15. The seal 32 is preferably an inorganic substance, such as a glass frit, which has been applied and fused in order to create a hermetic seal and adhesive bond between the bottom substrate 12 and the top substrate 14. Openings 22 are provided in the seal 20 at least two locations in order to provide for filling of the LDC 10 with a liquid crystal fluid 30. The relationship of the aforementioned components can best be appreciated by referring to both FIG. 1 and FIG. 2. After the gap 25 between the top and bottom substrates has been filled with the liquid crystal fluid 30, the openings 22 are closed with a sealant in order to retain the fluid within the LCD 20.

Figure 3:
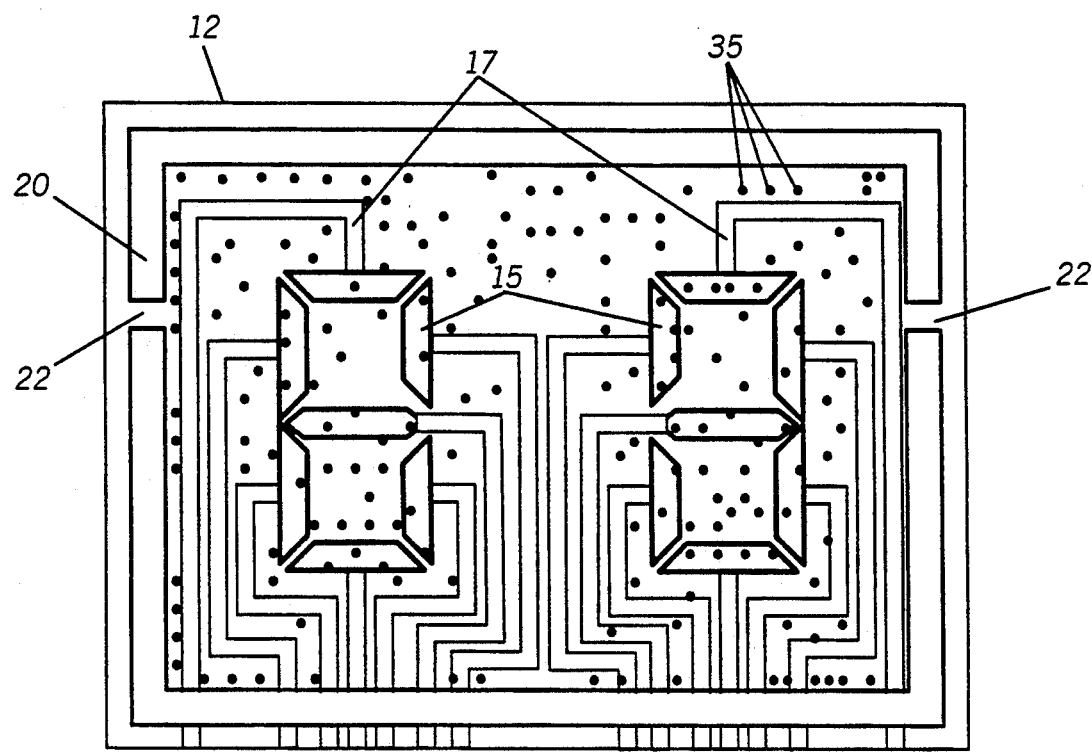
FIG. 3 is a plan view of a substrate with spacers applied in accordance with the invention.

Referring now to FIG. 1, the desired spacing between the top substrate 14 and the bottom substrate 16 is maintained by random distribution of spherical particles or spacers 35. The spacers 35 provide a spacing function for controlled separation of the two substrates. While indicated as round balls here, the particles 35 may also be beads of irregular shape. In any case, the spacers should have approximately uniform distribution of diameters in ranges from five to twenty-five microns, with other sizes being employed as desired. The spacers 35 provide support and add mechanical structure to the LCD and serve to prevent either or both the bottom substrate 12 and the top substrate 14 from sagging inward and creating an irregular gap 25. FIG. 3 shows a plan view of an LCD 10 where the spacers 35 are distributed over the surface of the bottom substrate 12. It should be noted that the spacers 35 have a generally random but uniform distribution across the surface of the bottom substrate 12. The actual amount of spacers employed, and the density of spacers on the surface of the substrate is, of course, left to the individual designer, but it is preferable to provide spacer application density that achieves a satisfactory spacing function without substantially impairing the optical properties of the LCD.

A process for manufacturing a substrate to be used in an LCD will now be described. The substrate 12 is typically a glass blank but may also be plastic or other polymers. Typically, the electrical pattern 15 is an indium tin oxide coating which has been etched to provide the desired pattern.

Figure 4:
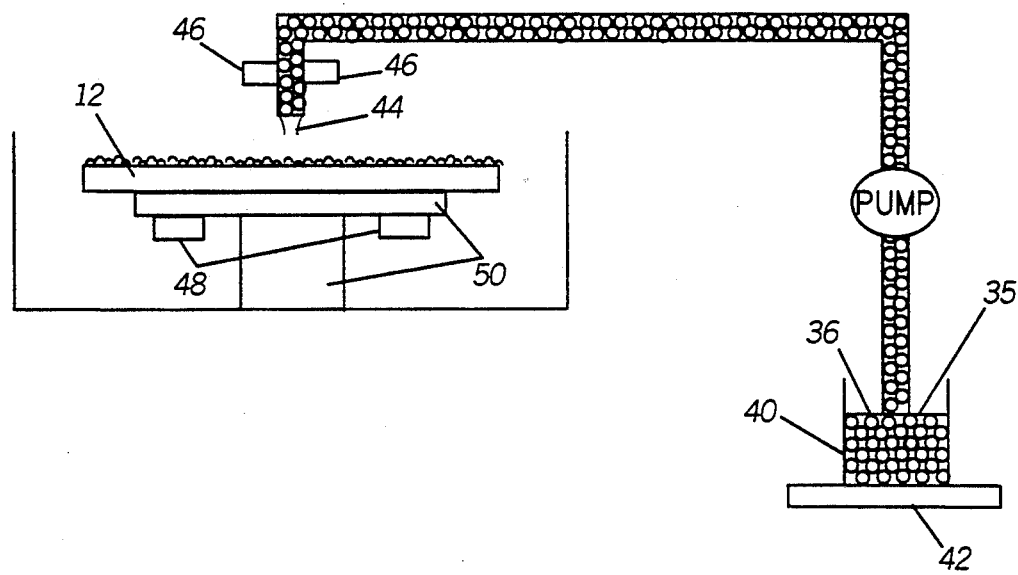
FIG. 4 is a schematic view of an apparatus used in accordance with the invention.

A preferred method of applying the spacers to the substrate is shown schematically in FIG. 4. The spacers 35 are suspended in a liquid 36 to form a dispersion. The composition of the dispersion is typically about 97 to 99.9% alcohol and 0.05 to about 1% spacers by weight. In addition, about 0.2 to about 1% of a dispersant is added to the admixture in order to prevent the spheres from clumping together or agglomerating, and to provide good flow and wetout of the admixture on the surface of the substrate 12. The alcohols typically used as the carriers for the dispersion are methanol, ethanol, or propyl alcohol, with propyl alcohol being the preferred alcohol, or mixtures of any of the above. In addition, the dispersant is typically an ester alcohol, such as 2,2,4-trimethyl-1,3-pentanediol monoisobutyrate. Once the three components have been formulated into an admixture, the mixture is placed into a reservoir 40. In order to maintain a uniform dispersion of the spacers in the liquid medium, the admixture is agitated, typically by applying ultrasonics. In the preferred embodiment, an ultrasonic transducer is positioned near the reservoir 40 so as to impart ultrasonic energy and the required agitation to the admixture. The admixture is then pumped to a dispenser 44 to be deposited on the substrate 12. Placement of additional ultrasonic transducers 46 at the point of dispensing is desirable in order to maintain uniform dispersion of the spacers in the liquid. However, depending upon the particular equipment used, the transducers 46 are optional. In the preferred embodiment of the invention, the substrate 12 is mounted on a spinner 50, similar to that used for applying photoresist or other dielectric materials onto semiconductor wafers. During the application of the admixture to the substrate 12, the substrate is rapidly rotated about its center axis. Wafer spinners and their use with substrates are well known to those skilled in the semiconductor industry. The admixture is dispensed near the central axis of the substrate and is evenly distributed across the surface of the substrate by centrifugal force during rotation of the substrate. In addition, in the preferred embodiment of the invention, ultrasonic energy is applied to the substrate during dispensing and spinning in order further prevent agglomeration or clumping of the spacers during application. As in the use of ultrasonic transducers 46 at the dispensing nozzle, the ultrasonic transducers 48 are optional but have been found to enhance the dispersion and uniformity of spacer application onto the substrate. After a thin, uniform coating of the admixture has been applied to the substrate, the liquid component of the admixture is evaporated from the substrate, leaving a residue of the spacers. The liquid may be evaporated from the substrate in any number of conventional ways. For example, continued spinning of the substrate, or simply allowing the liquid to evaporate from the substrate at room temperature, or heating the substrate to enhance or increase the evaporation rate of the liquid from the substrate.

The components of the admixture having been previously recited, will now be further detailed. The spacers may be any number of requisite materials, for example, glass micro-balloons or microspheres, ceramic particles, or plastic or polymeric particles. The choice of material used for the spacers is obviously one of a designer's choice, but in the preferred embodiment, polymeric spheres are employed. The exact size and shape of the spacers is also left to the discretion of the designer, and they need not be spherical but may be random or irregularly shaped. It is also desirable if the spacers are of a uniform distribution particle size. One example of a suitable spacer is Micropearl SP manufactured by Sekisui Fine Chemical Company, Ltd. Micropearl SP is a spherical particle consisting of a cross-linked polymer principally based on polystyrene divinylbenzene. It has a relatively narrow particle size distribution, and a specific gravity and coefficient of thermal expansion (CTE) close to that of conventional liquid crystal materials, making it well suited for application in LCD panels. It is important to approximately match the CTE of the spacers to that of the liquid crystal fluid because as the temperature of the environment changes, the thickness of the liquid crystal layer also changes. It is important that the spacers respond to this change in thickness at a rate approximately corresponding to that of the liquid crystal fluid in order to maintain the proper gap in the display. Typical size ranges of the polymeric spheres are 3 to 10 microns in increments of 0.25 microns.

The use of a dispersing agent is key to proper formation of an evenly distributed spacer layer. Ester alcohols have been found to be advantageous in providing proper dispersion of the plastic spheres in the liquid and, in particular, an ester alcohol such as 2,2,4-trimethyl-1,3-pentanediol monoisobutyrate has been found to be very useful. This dispersant is added to the admixture at a concentration of about 0.2% to 2% by weight. In addition, methyl, ethyl or propyl alcohol have been found to be effective when used alone or in combination as a medium for dispersing the plastic spheres. It is thought that the use of the alcohols along with the ester alcohol dispersing agent reduces the surface tension and the viscosity of the solution to provide optimum dispersion of the plastic spheres in the liquid. One example of a useful formation of an admixture is now disclosed.

EXAMPLE 1

| | |
|---|---|
| Isopropanol | 99.5% by weight |
| Micropearl SP spheres 10 micron diameter | 0.1% by weight |
| 2,2,4-trimethyl-1,3-pentanediol monoisobutyrate | 0.4% by weight |
| Total: | 100.0% by weight |

The amount of each of these materials is given by weight percent. This admixture was applied to a substrate using the methodology in accordance with the invention and the substrate was examined by laser scanning microscopy. The admixture was agitated by ultrasonics in a reservoir, pumped to a dispersing nozzle which also had an ultrasonic transducer attached to it, and was dispensed onto a spinning substrate. The substrate was impacted by ultrasonic energy while it was spinning and while the admixture was coating the substrate. After evaporation of the alcohol and dispersing agent, the polymeric spheres were left randomly distributed on the substrate with no other visible residue.

EXAMPLE 2 (CONTROL)

| | |
|---|---|
| Isopropanol | 99.9% by weight |
| Micropearl SP spheres 10 micron diameter | 0.1% by weight |
| Total: | 100.0% by weight |

The control formulation was made in a manner similar to Example 1, however, the ester alcohol dispersing agent was eliminated. This admixture was applied to the substrate in the same manner as in Example 1, and examined. A high degree of clumping of the spheres in small groups or islands was noted. This was judged to be unacceptable because of the dark spots created in the liquid crystal display.

EXAMPLE 3

| | |
|---|---|
| Isopropanol | 94.9% by weight |
| Micropearl SP spheres 10 micron diameter | 0.1% by weight |
| 2,2,4-trimethyl-1,3-pentanediol monoisobutyrate | 5% by weight |
| Total: | 100.0% by weight |

This formulation was made in a manner similar to Example 1, however, a larger amount of the ester alcohol dispersing agent was added. This admixture was applied to the substrate in the same manner as in Example 1, and examined. A high degree of clumping of the spheres in small groups or islands was noted. This was judged to be unacceptable because of the dark spots created in the liquid crystal display.

Other methods of application of the admixture containing the dispersing agent onto the substrate may be used. For example, an ultrasonically agitated reservoir of the admixture could be connected to, for example, an airless gun, similar to an airless paint sprayer, that would vibrate the mixture during application. Depending upon the exact equipment chosen by the individual, spinning may or may not be necessary, along with agitation of the substrate. For example, the use of an airless paint sprayer type gun might allow one to simply spray onto a flat or slightly inclined substrate that is held stationary.

Having indicated above the preferred embodiments of the described invention, it will occur to those skilled in the art that various modifications and alterations can be made to the disclosed method and apparatus without departing from the spirit of the invention. Different combinations of many of the above indicated component and process steps can also be employed. It is, accordingly, intended to limit the scope of the invention only as indicated in the claims appended herein.

We claim:

1. A process for manufacturing a device for containing a liquid crystal material between two spaced electrodes, comprising:
   providing a substrate having a first surface;
   forming a plurality of spacers distributed on the substrate first surface by:
   applying to the first surface an admixture comprising:
   spacers, comprising polymeric spheres;
   a liquid comprising:
   one or more alcohols selected from the group consisting of methanol, ethanol, or propanol; and
   a dispersant, comprising 2,2,4-trimethyl 1,3 pentanediol;
   the spacers dispersed in the liquid while agitating a reservoir of the admixture with ultrasonics to maintain a uniform dispersion of the spacers in the liquid;
   spinning the substrate while applying the admixture;
   applying ultrasonics to the substrate while applying the admixture; and
   applying ultrasonics at the point of application of the admixture onto the first surface while applying the admixture; and
   evaporating, at ambient temperature, the liquid from the first surface, leaving a plurality of spacers distributed on the substrate first surface.

2. A process for manufacturing a device for containing a liquid crystal material between two spaced electrodes, comprising:
   providing a substrate having a first surface;
   forming a plurality of spacers distributed on the substrate first surface by:
   applying to the first surface an admixture comprising:
   spacers, comprising polymeric spheres;
   a liquid comprising:
   one or more alcohols selected from the group consisting of methanol, ethanol, or propanol; and
   a dispersant, comprising an ester alcohol present in amounts between about 0.1% and 1.0% by weight;
   the spacers dispersed in the liquid while agitating a reservoir of the admixture with ultrasonics to maintain a uniform dispersion of the spacers in the liquid;
   spinning the substrate while applying the admixture;
   applying ultrasonics to the substrate while applying the admixture; and
   applying ultrasonics at the point of application of the admixture onto the first surface while applying the admixture; and
   evaporating, at ambient temperature, the liquid from the first surface, leaving a plurality of spacers distributed on the substrate first surface.

3. A process for manufacturing a device for containing a liquid crystal material between two spaced electrodes, comprising the steps of:

A) providing a substrate having a first surface;

B) forming a plurality of spacers distributed on the substrate first surface by;

applying to the first surface an admixture comprising;

spacers, comprising polystyrene divinylbenzene spheres;

a liquid that does not contain any chlorofluorocarbon solvents, comprising;

one or more alcohols selected from the group consisting of methanol, ethanol, or propanol; and a dispersant, comprising 2,2,4-trimethyl 1,3 pentanediol, in an amount between about 0.1% and 1.0% by weight;

the spacers dispersed in the liquid by agitating a reservoir containing the admixture with ultrasonic vibration to maintain a uniform dispersion of the spacers in the liquid;

spinning the substrate while applying the admixture;

applying ultrasonic vibration to the substrate while applying the admixture; and applying ultrasonic vibration at the point of application of the admixture onto the first surface while applying the admixture; and C) evaporating the liquid from the first surface at ambient temperature, thereby leaving a plurality of spacers distributed on the substrate first surface.

* * * * *